United States Patent Office 3,391,150
Patented July 2, 1968

---

3,391,150
THIADIAZOLE COMPOUNDS AND PROCESSES FOR PREPARING SAME
Leonard M. Weinstock, Rocky Hill, N.J., assignor to Merck & Co., Inc., Rahway, N.J., a corporation of New Jersey
No Drawing. Filed Dec. 17, 1965, Ser. No. 514,707
4 Claims. (Cl. 260—302)

ABSTRACT OF THE DISCLOSURE 4-hydroxy and 4-amino-1,2,5-thiadiazoles are prepared by the reaction of α-amino acid amides or α-amino acid amidines with sulfur mono- or sulfur dihalides. The thiadiazoles so produced are useful intermediates in the preparation of the corresponding 4-sulfanilamido-1,2,5-thiadiazoles.

---

This invention relates to a novel method of preparing 4-hydroxy and 4-amino-1,2,5-thiadiazole compounds. It is concerned more specifically with a process for making 4-hydroxy and 4-amino-1,2,5-thiadiazoles which may be substituted at the 3-position with a hydrocarbonyl radical. It relates still more specifically to the synthesis of 4-hydroxy and 4-amino-1,2,5-thiadiazole compounds by the reaction of α-amino acid amides or amidines with sulfur monohalide or sulfur dihalide. Additional features of the invention will become clear from the following description of the process.

It has now been discovered in accordance with the present invention that 4-hydroxy and 4-amino-1,2,5-thiadiazoles are produced in high yield by a process which may be represented structurally as:

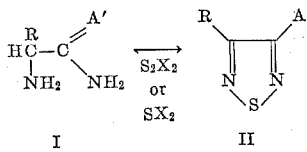

In these formulas R represents hydrogen, lower alkyl such as methyl, ethyl, isopropyl or amyl, aryl or which phenyl and substituted phenyl are preferred, or aralkyl such as benzyl or phenylethyl; A' represents O or NH; A represents hydroxy or amino; X represents chloro or bromo, and preferably chloro. It will be understood by those versed in this art that when A' is O, A will be hydroxy, and when A' is NH, A will be amino. The 1,2,5-thiadiazoles of Formula II above are useful intermediates in the preparation of 3-sulfanilamido-4-R-1,2,5-thiadiazole compounds, which substances exhibit antibacterial and antiparasitic activity.

The 3-R-4-A-1,2,5-thiadiazoles, where R and A are as previously defined, are prepared according to this invention by reacting together an amide or amidine of Formula I above with sulfur dihalide or sulfur monohalide. Either a sulfur bromide or chloride may be employed, but the chlorides are more readily available and are preferred. Consequently reference will be made to sulfur mono- and dichloride in describing the invention, it being understood that similar reaction conditions are used with sulfur bromides.

The α-amino acid amide or amidine compounds used as one of the starting materials in this process may be charged to the reaction in the form of the free base or as an amine salt. When a salt is used it dissociates in the solvent thus making the base available for reaction with the sulfur chloride. There is no criticality in any particular amine salt, and any salt may be employed. The mineral acid salts such as hydrochlorides, hydrobromides, sulfates, bisulfates and the like are readily accessible and either one of these or the free base is ordinarily used. The α-amino acid amidines, and to a lesser extent the α-amino acid amides, are not highly stable as the free base and it is therefore generally preferred to employ acid salts such as hydrochlorides or hydrobromides. This is not, however, essential since the free base is the reacting species.

Optimum results in synthesizing the 1,2,5-thiadiazoles of Formula II are achieved by adding the α-amino acid amide or amidine to a solution of sulfur mono- or dichloride in a suitable reaction solvent. This order of addition is not critical but does represent a convenient method of controlling reaction rate and minimizing the formation of by-products. As solvent, there is employed a non-aqueous organic solvent, examples of suitable ones being benzene, tetrahydrofuran, dimethylformamide and dialkanoamides such as dimethylacetamide.

The formation of 3-R-4-hydroxy (or 4-amino)-1,2,5-thiadiazole takes place satisfactorily at temperatures of about 20–30° C., i.e. at or slightly below room temperatures, although elevated temperatures of up to about 125° C. may be used if it is desired to do so. Although the optimum reaction time is at least partly a function of temperature, the process takes place rapidly and is substantially complete at room temperature in from about 2–6 hours. At elevated temperature, the reaction time may be reduced. The reaction requires two moles of sulfur monochloride or sulfur dichloride per mole of α-amino acid amide or amidine. It is preferred therefore to use at least the stoichiometric amount of sulfur chloride, and good results are achieved with up to about 10 moles, and preferably from 2.5–6 moles of sulfur chloride per mole of amide or amidine.

The 3-R-4-hydroxy (or 4-amino) 1,2,5-thiadiazoles, where R is hydrogen or a hydrocarbonyl radical, are reasonably low melting crystalline solids which may be isolated and purified without undue difficulty. One convenient recovery method is to quench the reaction mixture in cold water and extract the thiadiazole compound into a water-immiscible solvent. After removal of the organic solvent, as by distillation, the residual 3-R-4-hydroxy-(or 4-amino) 1,2,5-thiadiazole may be purified by recrystallization or sublimation.

Representative examples of 1,2,5-thiadiazoles obtained according to the process described herein are 3-methyl-4-hydroxy - 1,2,5 - thiadiazole, 3-propyl-4-hydroxy-1,2,5-thiadiazole, 4-hydroxy-1,2,5-thiadiazole, 4-amino-1,2,5-thiadiazole, 3-methyl-4-amino-1,2,5-thiadiazole, 3-phenyl-4-amino-1,2,5-thiadiazole, 3-benzyl-4-amino-1,2,5-thiadiazole, 3-amyl-4-amino-1,2,5-thiadiazole, and 3-ethyl-4-amino-1,2,5-thiadiazole.

The following examples are given for the purpose of illustration and not by way of limitation.

Example 1

0.1 mole of the α-amino acid amide identified in Table I, column 1, is added to a solution of 24.3 ml. (0.3 m.) of sulfur monochloride in 50 ml. of dimethylformamide. The addition is carried out over a 30 minute period at 20–25° C. The resulting slurry is stirred for 5 hours at room temperature and then poured into 250 ml. of ice water. The mixture is filtered to remove precipitated sulfur and the aqueous filtrate extracted with four 100 ml. portions of ethyl ether. The ether extracts are combined, washed with about 30 ml. of water and dried over magnesium sulfate. The ether extracts are then evaporated to dryness. The residue thus obtained consists primarily of 3-R-4-hydroxy-1,2,5-thiadiazole, the meaning of R in the hydroxythiodiazole corresponding to R in the amino acid amide employed as starting material. The thiadiazole product is purified by (a) recrystallization from cyclohexane, (b) recrystallization from water or (c) by sublimation at 60° C./1 mm. The melting points and ultraviolet absorption characteristics of 3-R-4-hydroxy-1,2,5-thiadiazole compounds prepared in this way are set forth in Table I below.

TABLE I $$\underset{\underset{NH_2}{|}}{\overset{R}{\underset{|}{HC}}}-\overset{O}{\underset{NH_2}{C}} \xrightarrow{S_2Cl_2} \underset{S}{\underset{\diagdown \diagup}{\overset{R}{\underset{N \quad N}{\diagup \diagdown}}\overset{OH}{\diagup}}}$$

| R= | 3-R-4-Hydroxy-1,2,5-Thiadiazole | | Method of Purification |
|---|---|---|---|
| | M.P. (° C.) | U.V. $\lambda_{max}^{MeOH}$ (E percent) | |
| H | 127.5–128.5 | 273 (727) | (a) |
| —CH₃ | 151–153 | 275 (717) | (b) |
| —CH₂CH₃ | 96–98 | 275 (660) | (b) |
| —CH(CH₃)₂ | 84–86 | 275 (616) | (b) |
| —CH₂CH(CH₃)₂ | 37.5–38.5 | 277 (553) | (c) |
| —CH₂C₆H₅ | 137–139 | 279 (422) | (b) |
| —C₆H₅ | 166–168 | 304 (885) | (a) |
| —C₄H₉ | 42–44 | | (b) |
| —C₃H₇ | 62–64 | | (b) |

Example 2

The 3-R-4-hydroxy-1,2,5-thiodiazoles set forth in Table I of Example 1 are also obtained by reacting 0.1 mole of the α-amino acid amide starting materials of Example 1 with 0.3 mole of sulfur dichloride in 50 ml. of benzene for three hours at a temperature of 50–60° C. The reaction mixture is poured into an equal volume of ice-water, the benzene layer (containing the 1,2,5-thiodiazole) separated, dried and concentrated to dryness. The residual 3-R-4-hydroxy-1,2,5-thiadiazole is purified as in Example 1.

Example 3

The 3-R-4-hydroxy-1,2,5-thiadiazole compounds prepared as described in Examples 1 and 2 are converted to the corresponding 3-R-4-chloro-1,2,5-thiadiazoles by the following method: 1 part by weight of 3-R-4-hydroxy-1,2,5-thiadiazole and 4 parts by weight of phosphorous oxychloride are heated together at 100° C. in an open Carius tube until the evolution of hydrogen chloride is complete. The tube is then sealed and heated at 160° C. for 16 hours. The contents of the tube are poured onto 30 parts by weight of ice and the resulting mixture steam distilled. The 3-R-4-chloro-1,2,5-thiadiazole steam distills and is recovered from the steam distillate by extraction into ethyl ether and removal of the ether solvent.

These compounds may be converted to the corresponding 3-R-4-sulfanilamido-1,2,5-thiadiazoles (where R is hydrogen, alkyl, phenyl or benzyl) by condensation with sulfanilamide in the presence of a base, as illustrated below for making 3-sulfanilamido-1,2,5-thiadiazole (R=hydrogen)

A mixture of 5.2 g. (0.3 mole) of sulfanilamide, 4.1 g. (.03 mole) of potassium carbonate, .8 ml. (1.2 g., .01 mole) of 3-chloro-1,2,5-thiadiazole, and 5.2 g. of acetamide is heated with stirring at 125° C. for one hour. 10 ml. of water is added and the mixture distilled until the vapor temperature reaches 100° C. The residual solution is cooled, allowed to stand overnight and filtered to remove unchanged sulfanilamide. The filtrate is brought to pH 2–3 with concentrated hydrochloric acid. The precipitated 3-sulfanilamido-1,2,5-thiadiazole is filtered and washed with water. The yield of crude product is 1.0 g. The product is purified by dissolving in 4 ml. of water and .3 ml. of concentrated ammonia at room temperature. The solution is decolorized with charcoal and the filtrate made pH 3 with .4 ml. of concentrated hydrochloric acid. Pure 3-sulfanilamido-1,2,5-thiadiazole precipitates and is recovered by filtration.

Example 4

2.35 gm. (0.01 M) of α-amino acetamidine dihydrobromide in 8 ml. of dimethyl formamide is mixed with 2.43 ml. (0.03 M) of sulfur monochloride and the mixture stirred at room temperature for 16 hours. The reaction mixture is quenched into 12 ml. of ice water. The resulting mixture is filtered to remove the precipitated sulfur and made alkaline with dilute sodium hydroxide. The mixture is extracted three times with 20 ml. of ether. The ether extracts are combined, dried over magnesium sulfate and evaporated to yield 3-amino-1,2,5-thiadiazole.

When α-amino acid amidines of the structure

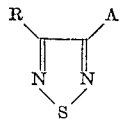

where R is lower alkyl, phenyl or benzyl, such as α-amino butyramidine, α-amino propamidine and α-amino benzamidine, are used in the above experiment in place of acetamidine, the corresponding 3-R-4-amino-1,2,5-thiadiazoles are obtained.

These substances may be converted by known methods to the corresponding 3-sulfanilamido-4-1,2,5-thiadiazoles.

Any departure from the above description which conforms to the present invention is intended to be included within the scope of the claims:

What is claimed is:

1. The method for preparing a 1,2,5-thiadiazole of the formula

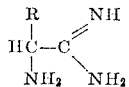

where A represents hydroxy or amino, and R represents hydrogen, lower alkyl, phenyl or benzyl, that comprises reacting an α-amino acid derivative of the formula

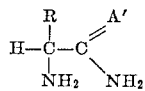

where R is as defined above and A' is O [or NH] when A is hydroxy and NH when A is amino, with sulfur monochloride or sulfur dichloride.

2. The process of claim 1 wherein A is hydroxy, A' is O and R is hydrogen.

3. The process of claim 1 wherein the reaction is carried out in a non-aqueous organic solvent.

4. The process of claim 1 wherein A is hydroxy, A' is O, and R is lower alkyl.

References Cited

Weinstock et al., Tetrahedron Letters, 1966, pp. 1263–8.

NICHOLAS S. RIZZO, *Primary Examiner.*

R. GALLAGHER, *Assistant Examiner.*